US012606230B2

(12) United States Patent
Yamashita et al.

(10) Patent No.: US 12,606,230 B2
(45) Date of Patent: Apr. 21, 2026

(54) ELECTRODE STRUCTURE

(71) Applicant: Panasonic Automotive Systems Co., Ltd., Kanagawa (JP)

(72) Inventors: Yasuhiro Yamashita, Osaka (JP); Takumi Yamada, Kyoto (JP); Tadashi Ezaki, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 55 days.

(21) Appl. No.: 18/644,749

(22) Filed: Apr. 24, 2024

(65) Prior Publication Data

US 2024/0375700 A1 Nov. 14, 2024

(30) Foreign Application Priority Data

May 12, 2023 (JP) ................................. 2023-079370

(51) Int. Cl.
B62D 1/06 (2006.01)
(52) U.S. Cl.
CPC ..................................... B62D 1/06 (2013.01)
(58) Field of Classification Search
CPC ........... B62D 1/046; B62D 1/06; B62D 1/065
See application file for complete search history.

(56) References Cited

U.S. PATENT DOCUMENTS

| | | | | |
|---|---|---|---|---|
| 4,353,266 A | * | 10/1982 | Grothe ..................... | B62D 1/11 |
| | | | | 74/552 |
| 4,547,655 A | * | 10/1985 | Kurata ................... | B62D 1/065 |
| | | | | 219/535 |

| | | | | |
|---|---|---|---|---|
| 10,654,508 B2 | * | 5/2020 | Fuji ........................... | H05B 3/16 |
| 11,457,512 B2 | * | 9/2022 | Wada ........................ | H05B 3/56 |
| 12,065,188 B2 | * | 8/2024 | Yamada ................... | B62D 1/06 |
| 12,202,535 B2 | * | 1/2025 | Yamashita ............... | B32B 5/18 |
| 2015/0367875 A1 | * | 12/2015 | Nonoyama ........... | B62D 1/065 |
| | | | | 219/204 |
| 2015/0369633 A1 | * | 12/2015 | Karasawa ............... | B62D 1/04 |
| | | | | 324/686 |
| 2021/0291229 A1 | * | 9/2021 | Hasegawa ............... | G01L 1/142 |
| 2023/0271641 A1 | * | 8/2023 | Yamashita ............. | B62D 1/065 |
| | | | | 219/204 |
| 2024/0337512 A1 | * | 10/2024 | Yamashita ............... | H05B 3/26 |

FOREIGN PATENT DOCUMENTS

| | | | | | | |
|---|---|---|---|---|---|---|
| JP | 2018013366 A | * | 1/2018 | | | |
| JP | 2023064696 A | * | 5/2023 | | | |
| JP | 2023103194 A | * | 7/2023 | | | |
| JP | 2023123973 A | * | 9/2023 | | | |
| JP | 2023124777 A | * | 9/2023 | ............. | B62D 1/065 |
| WO | WO 2013179341 A1 | | 12/2013 | | | |
| WO | WO-2023140436 A1 | * | 7/2023 | ............... | B60H 1/22 |

OTHER PUBLICATIONS

Noryl Wikipedia; https://en.wikipedia.org/wiki/Noryl.*
Machine translation of JP 2018-13366 A obtained on Aug. 14, 2025.*

* cited by examiner

*Primary Examiner* — Adam D Rogers
(74) *Attorney, Agent, or Firm* — Seed Intellectual Property Law Group LLP

(57) ABSTRACT

An electrode structure is arranged over a core metal of a steering wheel, and includes: a first resin layer; and a first electrode arranged on one surface of the first resin layer. The first resin layer is essentially made of a sheet or film of modified polyphenylene ether or modified polyphenylene oxide.

12 Claims, 13 Drawing Sheets

Outer circumferential side

Inner circumferential side

Outer circumferential side

20b

Inner circumferential side b b

ELECTRODE STRUCTURE

CROSS REFERENCE TO RELATED APPLICATION

The present application is based on and claims priority of Japanese Patent Application No. 2023-079370 filed on May 12, 2023.

FIELD

The present disclosure relates to an electrode structure.

BACKGROUND

Patent Literature (PTL) 1 discloses a film heater in which a heating wire, two thermoplastic polyimide films sandwiching, from above and below, a film that holds the heating wire, and two thermosetting polyimide films are stacked and heat-welded.

CITATION LIST

Patent Literature

PTL 1: WO 2013/179341 A1

Summary

However, the film heater according to PTL 1 can be improved upon.

In view of this, the present disclosure provides an electrode structure capable of improving upon the above related art.

An electrode structure according to one aspect of the present disclosure is an electrode structure that is arranged over a core metal of a steering wheel, the electrode structure including: a first resin layer; and a first electrode arranged on one surface of the first resin layer, wherein the first resin layer is essentially made of a sheet or film of modified polyphenylene ether or modified polyphenylene oxide.

An electrode structure according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 2A is a perspective view of the steering wheel according to the embodiment.

FIG. 11A is a perspective view of a steering wheel according to Variation 2 of the embodiment.

FIG. 14 is a cross sectional view of a steering wheel according to another variation, illustrating a first engagement-target portion and a first engagement portion.

DESCRIPTION OF EMBODIMENTS

Figure 1:
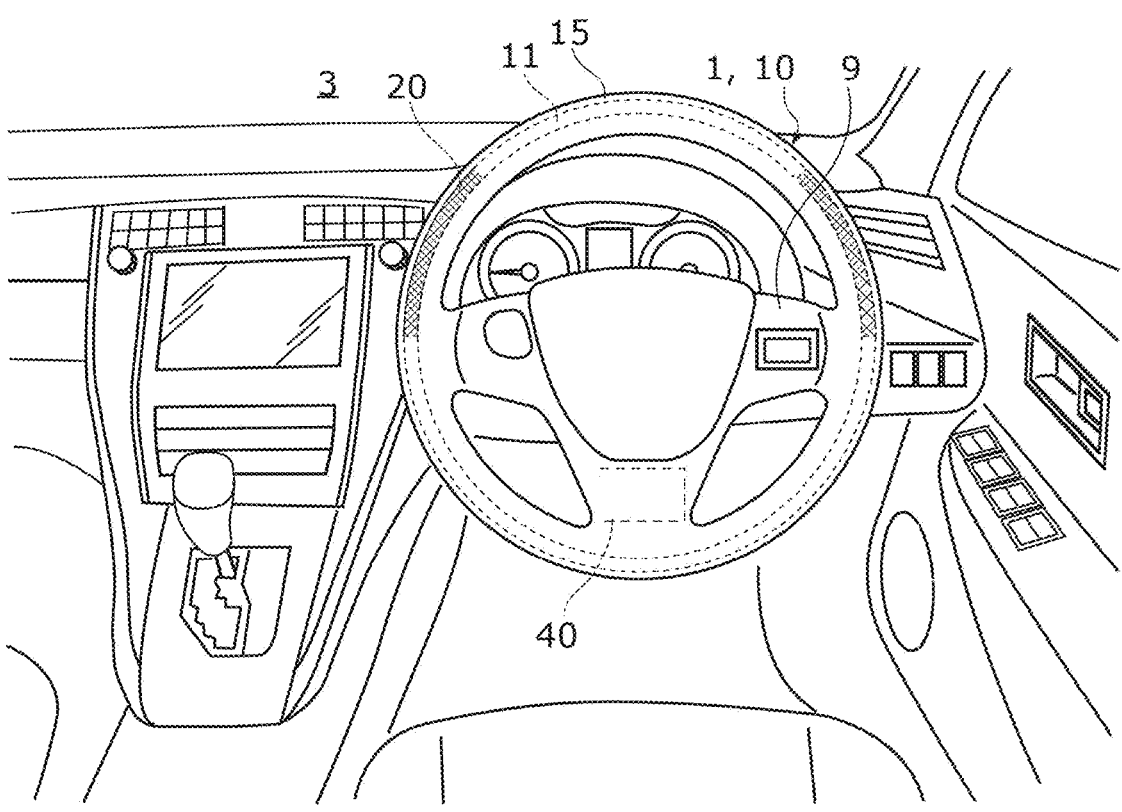
FIG. 1 is a diagram illustrating a passenger cabin of a vehicle in which a steering wheel according to an embodiment is provided.

Hereinafter, embodiments will be described in detail with reference to the drawings.

Note that the embodiments below each describe a general or specific example. The numerical values, shapes, materials, elements, the arrangement and connection of the elements, steps, orders of the steps etc. illustrated in the following embodiments are mere examples, and are not intended to limit the present disclosure. Furthermore, among the elements in the embodiments below, those not recited in any one of the independent claims will be described as optional elements.

In addition, the drawings are schematic diagrams, and do not necessarily provide strictly accurate illustrations. Throughout the drawings, the same reference numeral is given to the same element.

In the following embodiments, expressions such as approximately equal intervals and T-shaped are used. For example, the expressions approximately equal intervals and T-shaped do not only mean exactly equal intervals and exactly T-shaped, but also mean substantially equal intervals and substantially T-shaped, including an error of about several percent. More specifically, the expressions approximately equal intervals and T-shaped mean equal intervals and T-shaped to an extent that the advantageous effects of the present disclosure can be achieved. The same applies to other expressions using "approximately" and "shaped".

EMBODIMENT

[Configuration]

First, the configuration of steering wheel 1 will be described with reference to FIG. 1 to FIG. 6.

Figure 2B:
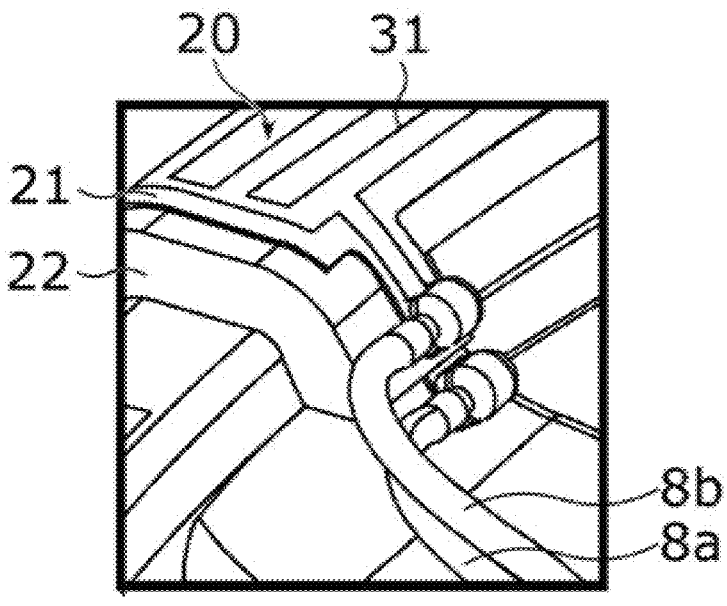
FIG. 2B is an enlarged view of part of an electrode structure of the steering wheel in FIG. 2A.
Figure 2C:
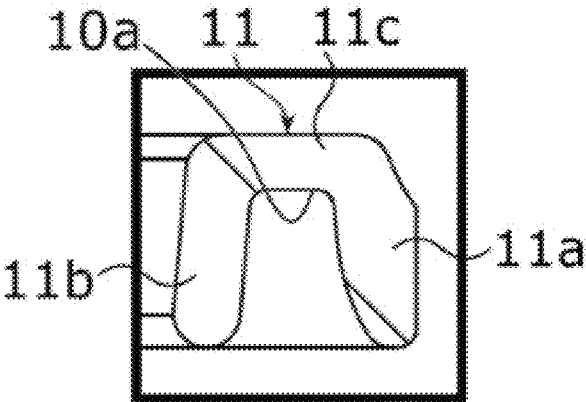
FIG. 2C is a cross sectional view of a core metal of the steering wheel in FIG. 2A.
Figure 3:
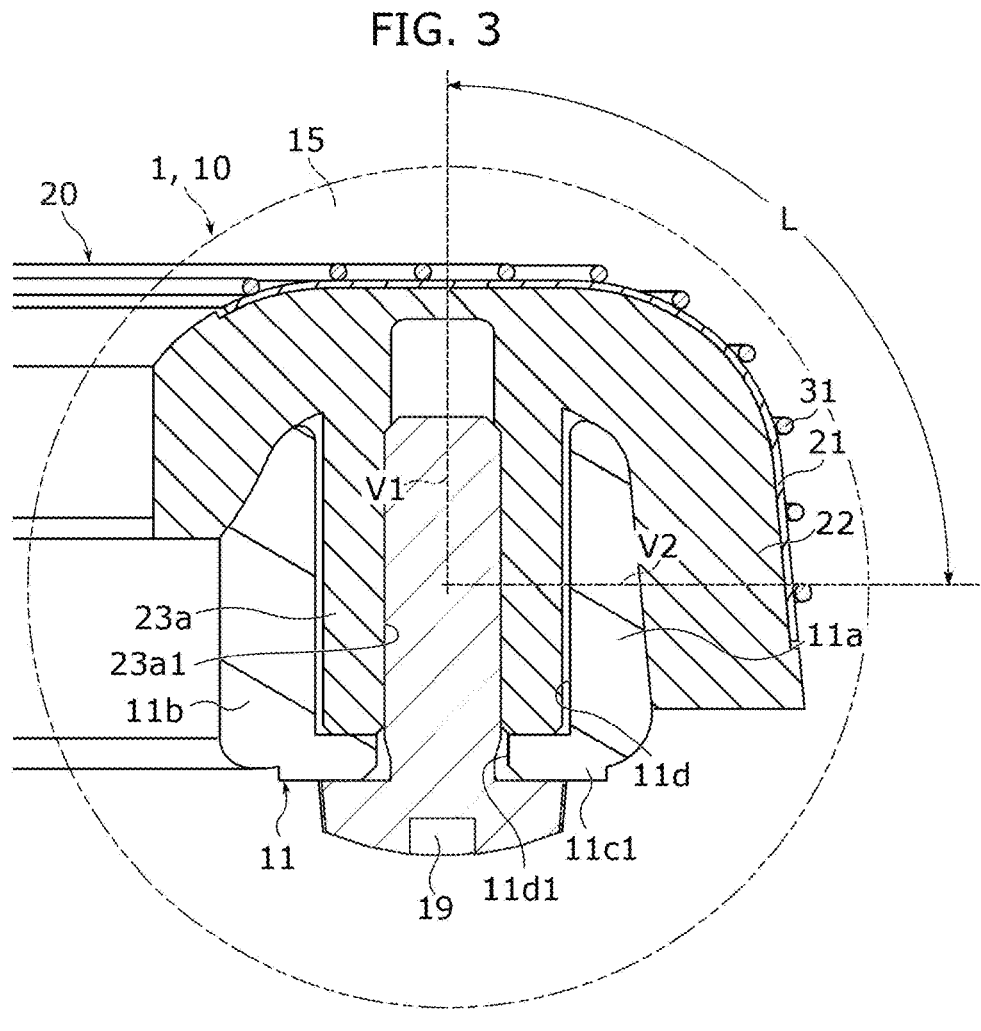
FIG. 3 is a cross sectional view of the steering wheel taken along line A-A in FIG. 2A, illustrating a first engagement-target portion and a first engagement portion.
Figure 4:
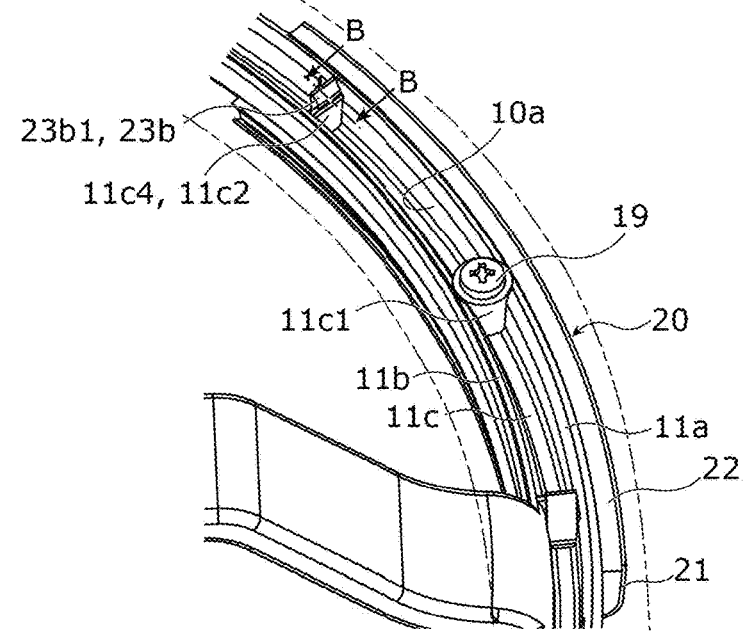
FIG. 4 is a perspective view of the steering wheel according to the embodiment, illustrating the first engagement-target portion, a second engagement-target portion, and a second engagement portion.
Figure 5:
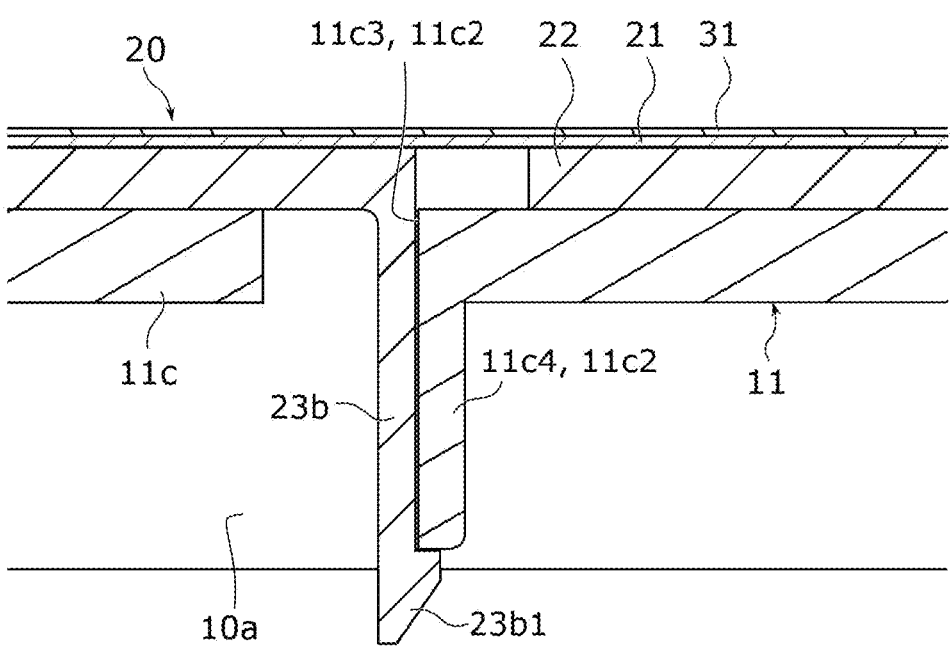
FIG. 5 is a cross sectional view of the steering wheel taken along line B-B in FIG. 4, illustrating the second engagement-target portion and the second engagement portion.
Figure 6:
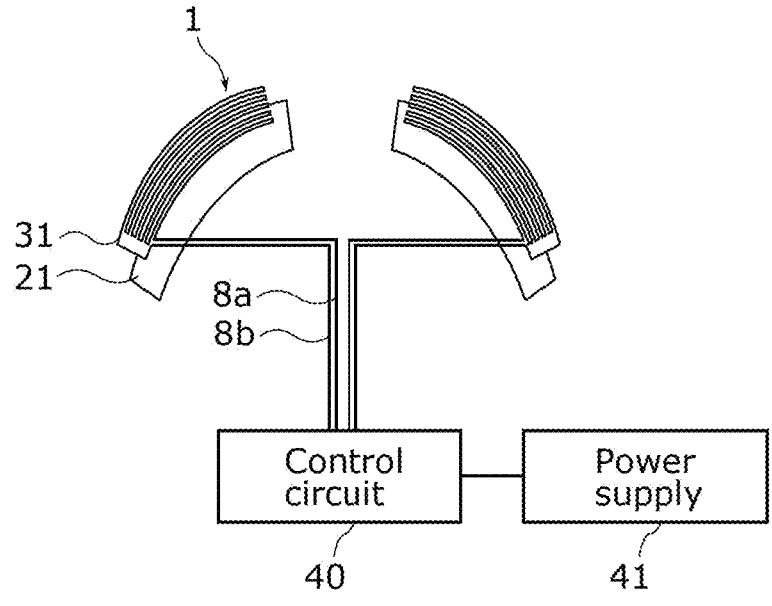
FIG. 6 is a block diagram illustrating the steering wheel according to the embodiment.
Figure 7A:
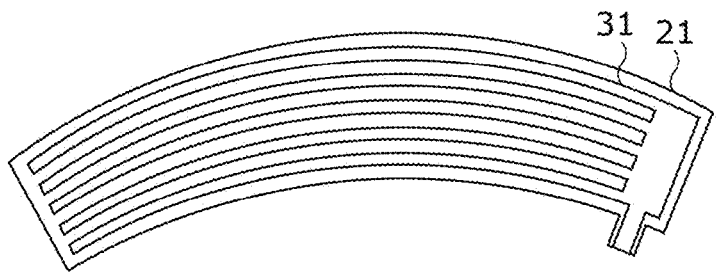
FIG. 7A is a plan view of a first electrode according to the embodiment.
Figure 7B:
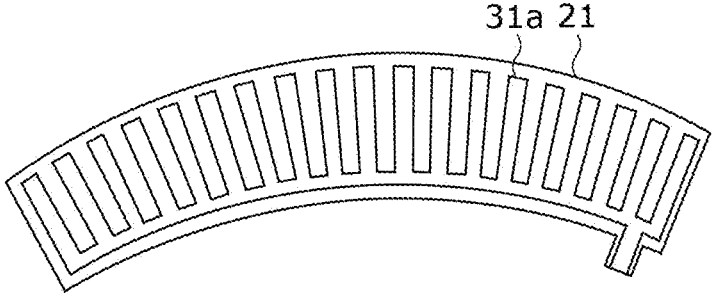
FIG. 7B is a plan view of another first electrode according to the embodiment.

FIG. 1 is a diagram illustrating the passenger cabin of vehicle 3 in which steering wheel 1 according to an embodiment is provided. FIG. 2A is a perspective view of steering wheel 1 according to the embodiment. FIG. 2B illustrates an enlarged view of part of electrode structure 20 and FIG. 2C illustrates a cross sectional view of core metal 11 taken at the dash-dotted line in FIG. 2A. FIG. 3 is a cross sectional view of steering wheel 1 taken along line A-A in FIG. 2A, illustrating first engagement-target portion 11c1 and first engagement portion 23a. FIG. 4 is a perspective view of steering wheel 1 according to the embodiment, illustrating first engagement-target portion 11c1, second engagement-target portion 11c2, and second engagement portion 23b. FIG. 5 is a cross sectional view of steering wheel 1 taken along line B-B in FIG. 4, illustrating second engagement-target portion 11c2 and second engagement portion 23b. FIG. 6 is a block diagram illustrating steering wheel 1 according to the embodiment. FIG. 7A is a plan view of first electrode 31 according to the embodiment. FIG. 7B is a plan view of first electrode 31a according to the embodiment.

As illustrated in FIG. 1, FIG. 2A, FIG. 2B, FIG. 2C, and FIG. 3, steering wheel 1 imparts a steering angle to, for example, the steering of vehicle 3.

Steering wheel 1 includes rim 10. Rim 10 is integrally formed with T-shaped spoke 9 arranged on the inner circumferential surface of rim 10.

Rim 10 includes core metal 11, electrode structure 20, and foam 15 that covers electrode structure 20.

As illustrated in FIG. 2A, FIG. 2B, FIG. 2C, and FIG. 3, core metal 11 is a metal annular core. More specifically, core metal 11 includes annular first portion 11a, annular second portion 11b arranged on the inner circumferential side of first portion 11a, and annular coupling portion 11c that couples first portion 11a and second portion 11b together. One end edge of first portion 11a is coupled to one end edge of coupling portion 11c, and one end edge of second portion 11b is coupled to the other end edge of coupling portion 11c. In other words, in a cross section of core metal 11 taken in a plane perpendicular to the circumferential direction of core metal 11 (hereinafter also referred to as the cross section of core metal 11), coupling portion 11c is arranged between first portion 11a and second portion 11b. The cross section of core metal 11 taken in this manner is, for example, U-shaped, V-shaped, J-shaped, or C-shaped. In FIG. 2A, FIG. 2B, and FIG. 2C, core metal 11 has a U-shaped cross section as an example.

Moreover, since core metal 11 has, for example, a U-shaped, V-shaped, J-shaped, or C-shaped cross section, first portion 11a, second portion 11b, and coupling portion 11c form recessed portion 10a in core metal 11. Recessed portion 10a is formed in an annular shape. In the present embodiment, recessed portion 10a opens to the side of rim 10 facing the front of vehicle 3 (i.e. the opposite side of rim 10 to the driver's seat side).

As illustrated in FIG. 3 and FIG. 4, first engagement-target portion 11c1 and second engagement-target portion 11c2 are formed in recessed portion 10a.

First engagement-target portion 11c1 is formed in recessed portion 10a, and is a cylindrical or round tubular projection that stands upright from the rear surface of coupling portion 11c. Insertion hole 11d, in which fastener 19, such as a screw, and first engagement portion 23a of insulating support 22 are insertable, is formed on the inside of first engagement-target portion 11c1. Screw hole 11d1, in which fastener 19 is insertable, is formed in the leading end in the direction toward which first engagement-target portion 11c1 stands upright. First engagement-target portion 11c1 is included in the engagement-target portion.

As illustrated in FIG. 4 and FIG. 5, second engagement-target portion 11c2 includes insertion through-hole 11c3 and upright wall 11c4 formed in recessed portion 10a. Second engagement portion 23b of insulating support 22 is inserted in insertion through-hole 11c3. Upright wall 11c4 is formed on the rear surface of coupling portion 11c, which is on the recessed portion 10a side, and is a plate-shaped projection that stands upright from the rear surface. Upright wall 11c4 is engaged with second engagement portion 23b inserted in insertion through-hole 11c3. Second engagement-target portion 11c2 is included in the engagement-target portion.

As illustrated in FIG. 1, FIG. 2A, FIG. 2B, and FIG. 2C, electrode structure 20 is a device that detects the driver's hand gripping steering wheel 1. Electrode structure 20 is arranged on the outer circumference of core metal 11 of steering wheel 1 provided in vehicle 3 to facilitate detection of the grip on steering wheel 1. More specifically, as illustrated in FIG. 3, electrode structure 20 is provided on core metal 11 so as to span from first portion 11a to second portion 11b through coupling portion 11c of core metal 11. In other words, a plurality of electrode structures 20 are provided on core metal 11, spanning from the outer circumferential side to the inner circumferential side of core metal 11 so as to cover core metal 11 except recessed portion 10a of core metal 11.

As illustrated in FIG. 6, control circuit 40, which is capable of detecting the driver's hand gripping steering wheel 1, is electrically connected to electrode structure 20. When rim 10 is gripped by the driver's hand, the capacitance between an electrode of electrode structure 20 and the hand changes. Control circuit 40 detects the driver's hand gripping steering wheel 1 based on an output signal in which the capacitance has changed. More specifically, control circuit 40 measures the capacitance of the electrode or a value (amount of change) corresponding to the capacitance, and detects the driver's hand gripping rim 10 based on the value. Control circuit 40 as described above is configured of a dedicated circuit or a general-purpose processor. Moreover, control circuit 40 is embedded in spoke 9 in FIG. 1, for example.

Electrode structure 20 is arranged in steering wheel 1 provided in vehicle 3. In the present embodiment, electrode structure 20 is embedded in rim 10 of steering wheel 1. In FIG. 1, etc., electrode structure 20 is provided on both the left and right sides of rim 10, as an example. Although FIG. 1, etc. illustrate an example in which a pair of electrode structures 20 are provided in part of rim 10, this example is non-limiting. For example, three or more electrode structures 20 may be provided in rim 10, and, alternatively, one electrode structure 20 may be provided in rim 10.

More specifically, as illustrated in FIG. 2A, FIG. 2B, FIG. 2C, and FIG. 3, electrode structure 20 includes first resin layer 21, insulating support 22, and first electrode 31.

First resin layer 21 is arranged over core metal 11 along the outer circumferential side surface of core metal 11 in a state of being separate from the surface of core metal 11. Here, the outer circumferential side surface of core metal 11 is, in a view of whole annular core metal 11, the surface opposite to the inner circumferential side surface of core metal 11 on which spoke 9 is arranged.

Long first electrode 31 extending in the circumferential direction of steering wheel 1 is arranged on the surface of first resin layer 21 opposite to its surface facing core metal 11. First resin layer 21 is sandwiched between first electrode 31 and insulating support 22. First resin layer 21 as described above makes it possible for first electrode 31 and core metal 11 to be separate from each other and for first electrode 31 to be arranged over insulating support 22.

In the present embodiment, first resin layer 21 extends in the longitudinal direction of first electrode 31 so as to have the same length as first electrode 31.

First resin layer 21 as described above is made of a resin material such as modified polyphenylene ether or modified polyphenylene oxide. Moreover, first resin layer 21 is sheet-shaped or film-shaped. For example, first resin layer 21 has a thickness of about several hundred micrometers (μm). The thickness of first resin layer 21 is preferably 200 μm or more.

Insulating support 22 is arranged on the side of first resin layer 21 closer to (i.e. facing) core metal 11. More specifically, insulating support 22 is arranged between core metal 11 and each of first electrode 31 and first resin layer 21. Insulating support 22 can have first electrode 31 and first resin layer 21 arranged on its surface so that first electrode 31 and core metal 11 will not be electrically connected to each other.

Insulating support 22 is arranged to face core metal 11 of steering wheel 1. More specifically, insulating support 22 is coupled to core metal 11, and is arranged along the outer circumferential side surface of core metal 11. Thus, part of core metal 11 is covered with insulating support 22, first resin layer 21, and first electrode 31.

In the present embodiment, insulating support 22 extends in the longitudinal direction of first electrode 31 and first resin layer 21 so as to fill in the space between first resin layer 21 and core metal 11 and to have the same length as first electrode 31 and first resin layer 21, but this is non-limiting. Insulating support 22 may be arranged partially between first electrode 31 and core metal 11.

As illustrated in FIG. 3, FIG. 4, and FIG. 5, insulating support 22 includes first engagement portion 23a that engages first engagement-target portion 11c1 provided on core metal 11 and second engagement portion 23b that engages second engagement-target portion 11c2 provided on core metal 11. First engagement portion 23a and second engagement portion 23b are included in the engagement portion.

First engagement portion 23a engages first engagement-target portion 11c1 of core metal 11. More specifically, first engagement portion 23a can engage first engagement-target portion 11c1 by being inserted inside first engagement-target portion 11c1. In other words, first engagement portion 23a is a cylindrical or round tubular portion that stands upright from the surface of insulating support 22 facing core metal 11, and is fitted inside first engagement-target portion 11c1. First engagement portion 23a includes fastener hole 23a1 that corresponds to screw hole 11d1 of first engagement-target portion 11c1. First engagement portion 23a can be fastened to fastener 19 by inserting fastener 19 inserted through screw hole 11d1 of first engagement-target portion 11c1 into fastener hole 23a1 of first engagement portion 23a.

As illustrated in FIG. 4 and FIG. 5, second engagement portion 23b includes engagement claw 23b1 that engages second engagement-target portion 11c2 of core metal 11. More specifically, second engagement portion 23b includes engagement claw 23b1 that can be inserted in insertion through-hole 11c3 of second engagement-target portion 11c2 to engage upright wall 11c4 of second engagement-target portion 11c2. In other words, second engagement portion 23b is a rod-shaped or plate-shaped portion that stands upright from the surface of insulating support 22 facing core metal 11. Second engagement portion 23b is inserted in insertion through-hole 11c3 of second engagement-target portion 11c2 so that engagement claw 23b1 of second engagement portion 23b will hook onto upright wall 11c4 of second engagement-target portion 11c2. Although engagement claw 23b1 protrudes in the circumferential direction of core metal 11 in the present embodiment, engagement claw 23b1 may protrude in a direction intersecting the circumferential direction of core metal 11. Although upright wall 11c4 of core metal 11 is arranged orthogonal to the circumferential direction of core metal 11 in the present embodiment, upright wall 11c4 may be arranged in the circumferential direction of core metal 11 when engagement claw 23b1 protrudes in a direction intersecting the circumferential direction of core metal 11.

As illustrated in FIG. 3 and FIG. 4, one or more first engagement portions 23a and one or more second engagement portions 23b are arranged on insulating support 22. A plurality of first engagement-target portions 11c1 and a plurality of second engagement-target portions 11c2 are formed on core metal 11 in accordance with the number of first engagement portions 23a and the number of second engagement portions 23b. First engagement portions 23a may be arranged at approximately equal intervals on rim 10. Second engagement portions 23b may be arranged at approximately equal intervals on rim 10. First engagement-target portions 11c1 may be arranged at approximately equal intervals on rim 10. Second engagement-target portions 11c2 may be arranged at approximately equal intervals on rim 10.

Insulating support 22 is made of a resin material, for example, a rigid plastic such as polybutylene terephthalate or polyimide.

Insulating support 22 may be made of a resin material such as modified polyphenylene ether or modified polyphenylene oxide.

In addition, insulating support 22 has a certain thickness. A "certain thickness" means that insulating support 22 has a thickness of about several millimeters (mm), for example. Since insulating support 22 has a certain thickness, the rigidity of insulating support 22 is ensured.

First electrode 31 is a heater wire containing copper, aluminum, silver, or the like. First electrode 31 may include a metal thin film formed on first resin layer 21 by, for instance, application of conductive ink or etching. When first electrode 31 is a heater wire, first electrode 31 may be attached to first resin layer 21 with adhesive, double-sided tape, or the like, or sewn on first resin layer 21 with a sewing thread.

First electrode 31 is arranged on the surface of first resin layer 21 opposite to its surface facing core metal 11. More specifically, first electrode 31 is arranged along the surface of first resin layer 21 so as to sandwich first resin layer 21 with insulating support 22. The surface of first resin layer 21 is included in the one surface of first resin layer 21 according to the present disclosure. Since first electrode 31 is separate from core metal 11, first electrode 31 is not electrically connected to core metal 11.

First electrode 31 is arranged along the shape of insulating support 22. In other words, the shape of first electrode 31 corresponds to the shape of insulating support 22. In this case, the shape of first resin layer 21 corresponds to the shape of first electrode 31. Thus, first electrode 31 and first resin layer 21 are formed according to the size and shape of insulating support 22. First resin layer 21 may be formed by vacuum forming or the like.

First electrode 31, first resin layer 21, and insulating support 22 may be integrally formed, and, alternatively, may be formed as individual separable elements.

One end of first electrode 31 is electrically connected to harness 8a, and the other end of first electrode 31 is electrically connected to harness 8b.

As illustrated in FIG. 2A, FIG. 2B, and FIG. 2C, harness 8a is electrically connected to one end of first electrode 31, and also electrically connected to control circuit 40. Harness 8a and one end of first electrode 31 may be electrically connected by soldering harness 8a and one end of first electrode 31 together. Alternatively, harness 8a and one end of first electrode 31 may be electrically connected by riveting or eyeleting harness 8a and one end of first electrode 31 together.

Harness 8b is electrically connected to the other end of first electrode 31, and also electrically connected to control circuit 40. Harness 8b and the other end of first electrode 31 may be electrically connected by soldering harness 8b and the other end of first electrode 31 together. Alternatively, harness 8b and the other end of first electrode 31 may be electrically connected by riveting or eyeleting harness 8b and the other end of first electrode 31 together.

Since control circuit 40 is electrically connected to harnesses 8a and 8b, a DC voltage from control circuit 40 is applied to first electrode 31. The DC voltage applied to first electrode 31 is generated by power supply 41. First electrode 31 can generate heat using power from power supply 41 to warm the surface of rim 10, with it being possible to warm the hand gripping rim 10.

Since first electrode 31 is arranged on the surface of first resin layer 2 opposite to its surface facing insulating support 22, when the part of rim 10 in which first electrode 31 is arranged is gripped by the driver's hand, a capacitance is formed between first electrode 31 and the driver's hand. Control circuit 40 can thus detect the driver's hand gripping rim 10 based on the change in capacitance.

First electrode 31 may be arranged on the surface of first resin layer 21 facing insulating support 22. In this case, since first resin layer 21 is thin, the driver's hand gripping rim 10 can be warmed or the driver's hand gripping rim 10 can be detected as when first electrode 31 is arranged on the surface of first resin layer 21 opposite to its surface facing insulating support 22. The surface of first resin layer 21 facing insulating support 22 is included in the one surface of first resin layer 21 according to the present disclosure.

Therefore, in the present embodiment, first electrode 31 is a heater wire that can detect changes in capacitance. In this case, as illustrated in FIG. 7A, first electrode 31 may be sewn on one surface of first resin layer 21 as one piece composed of a series of zigzags formed by line portions in the circumferential direction of core metal 11 and U-turn portions so as to form a serpentine pattern. As illustrated in FIG. 7B, first electrode 31a may form a serpentine pattern in which line portions are approximately parallel to a direction orthogonal to the circumferential direction of core metal 11.

In a cross section of steering wheel 1 taken in a plane perpendicular to the circumferential direction of rim 10 of steering wheel 1 (hereinafter also referred to as the cross section of rim 10), insulating support 22, first electrode 31, and first resin layer 21 are arranged at least in the range from the outer circumferential side portion of rim 10 of steering wheel 1 to the portion of rim 10 facing the rear of vehicle 3.

In the present embodiment, first electrode 31, first resin layer 21, and insulating support 22 are each arranged in the circumferential direction of the cross section of rim 10 over a range of at least ¼th of the circumference. As illustrated in FIG. 3, first electrode 31, first resin layer 21, and insulating support 22 are each arranged over a range greater than range L between two straight lines V1 and V2 denoted by chain double-dashed lines. More specifically, first electrode 31, first resin layer 21, and insulating support 22 are arranged spanning from first portion 11a to second portion 11b through coupling portion 11c of rim 10. In this way, first electrode 31, first resin layer 21, and insulating support 22 are arranged in each part easily contacted by the driver's hand when the driver's hand grips rim 10, whereby the driver's grip on steering wheel 1 can be accurately detected by electrode structure 20.

As illustrated in FIG. 3, foam 15 is the portion that the driver grips with their hand, and forms the outline of rim 10 in steering wheel 1. Foam 15 is made of a material of urethane resin such as foamed polyurethane that covers at least first resin layer 21. In the present embodiment, core metal 11, insulating support 22, first electrode 31, and first resin layer 21 are embedded in foam 15. In other words, core metal 11, insulating support 22, first electrode 31, and first resin layer 21 are covered with foam 15 so as not to be exposed from foam 15.

Electrode structure 20 as described above can be assembled to core metal 11 as follows.

First engagement-target portion 11c1 of core metal 11 engages first engagement portion 23a of insulating support 22. In detail, first engagement portion 23a is engaged with first engagement-target portion 11c1, and first engagement portion 23a and first engagement-target portion 11c1 are fastened together by fastener 19 inserted in screw hole 11d1 of first engagement-target portion 11c1 and fastener hole 23a1 of first engagement portion 23a.

Second engagement-target portion 11c2 of core metal 11 engages second engagement portion 23b of insulating support 22. In detail, engagement claw 23b1 of second engagement portion 23b included in electrode structure 20 is engaged with second engagement-target portion 11c2 provided on core metal 11. This yields a structure in which electrode structure 20 is fastened to core metal 11.

Next, the structure is fixed in the cavity of a mold and the mold is clamped. The structure is covered using foam 15 while electrode structure 20 and core metal 11 are fastened together. Polyol and isocyanate are poured into the cavity in the mold through a gate formed in the mold and molded to form foam 15 that covers the structure. A chemical reaction between polyol and isocyanate produces foamed polyurethane.

Thus, foam 15 can cover electrode structure 20 and core metal 11 while electrode structure 20 is engaged with core metal 11. This yields steering wheel 1.

Advantageous Effects

Next, the advantageous effects of electrode structure 20 according to the present embodiment will be described.

The film heater made of thermosetting polyimide in PTL 1 mentioned above has difficulty in maintaining a desired shape. For example, when the film heater is assembled to the core metal of a steering wheel, the film heater has difficulty in maintaining a shape that follows the shape of the core metal of the steering wheel. When using a resin material that can easily maintain its shape in view of the above, there is room for improvement in durability.

As described above, electrode structure 20 according to the present embodiment is electrode structure 20 that is arranged over core metal 11 of steering wheel 1. Electrode structure 20 includes: first resin layer 21; and first electrode 31 arranged on one surface of first resin layer 21. First resin layer 21 is essentially made of a sheet or film of modified polyphenylene ether or modified polyphenylene oxide.

With this, the use of modified polyphenylene ether or modified polyphenylene oxide eases first resin layer 21 maintaining a desired shape. For example, it is possible to form first resin layer 21 along the shape of core metal 11 of steering wheel 1.

Moreover, when the electrode structure is applied to a steering wheel, a resin material that is not only easy to shape but also excellent in moisture resistance may be used given that sweat from a person's hand gripping the steering wheel may seep into the steering wheel. For example, when polycarbonate is used in the first resin layer, there is a possibility that amines present in the steering wheel promote hydrolysis of polycarbonate. In particular, if the steering wheel is warmed by hands, a heater, etc., the hydrolysis of polycarbonate is likely to be further promoted. Accordingly, a first resin layer excellent in durability such as moisture resistance may be used.

In the present embodiment, as a result of modified polyphenylene ether or modified polyphenylene oxide with excellent durability being used as first resin layer 21, electrode structure 20 excellent in durability can be provided.

Thus, electrode structure 20 can easily maintain a desired shape and has excellent durability.

In electrode structure 20 according to the present embodiment, first resin layer 21 is arranged close to core metal 11 in steering wheel 1, and the one surface of first resin layer 21 on which first electrode 31 is arranged is opposite to a surface of first resin layer 21 facing core metal 11.

With this, first electrode 31 can be located as close to the surface of steering wheel 1 as possible. Therefore, when first electrode 31 is used as a grip sensor, the grip detection sensitivity can be increased because first electrode 31 is situated closer to the driver's hand. Moreover, when first electrode 31 is used as a heater wire, the heat of first electrode 31 is easily conducted to the surface of steering wheel 1. This can reduce the amount of power consumed by first electrode 31.

In electrode structure 20 according to the present embodiment, first electrode 31 is formed of a conductive wire, a metal thin film, or a conductive ink.

With this, first electrode 31 having a desired shape can be arranged on the surface of first resin layer 21. Thus, for example, first electrode 31 can be formed into a predetermined wiring pattern. In this way, first electrode 31 can be formed on the surface of first resin layer 21 depending on the intended use of electrode structure 20.

In electrode structure 20 according to the present embodiment, first electrode 31 is a heater wire.

With this, first electrode 31 can be used as a heater wire that warms steering wheel 1.

In electrode structure 20 according to the present embodiment, first electrode 31 functions as a heater that warms steering wheel 1.

With this, first electrode 31 serving as a heater wire can be arranged on the surface of first resin layer 21 (i.e. on the side closer to the surface of steering wheel 1), so that the heat produced when first electrode 31 is heated is easily conducted to the surface of steering wheel 1. An increase in the time required for warming the surface of steering wheel 1 can thus be suppressed.

In electrode structure 20 according to the present embodiment, first electrode 31 is an electrostatic sensor electrode.

With this, first electrode 31 can be used as an electrostatic sensor electrode that detects a grip on steering wheel 1. First electrode 31 can also be used as a heater wire.

In electrode structure 20 according to the present embodiment, the electrostatic sensor electrode is a grip sensor that detects a grip on steering wheel 1.

With this, first electrode 31 can detect the driver's hand gripping steering wheel 1 as an electrostatic sensor electrode that detects a grip on steering wheel 1.

Electrode structure 20 according to the present embodiment further includes: foam 15 containing foamed polyurethane that covers at least first resin layer 21.

With this, since foamed polyurethane is compatible with modified polyphenylene ether or modified polyphenylene oxide used in first resin layer 21, a chemical reaction of foam 15 and first resin layer 21 is unlikely to occur. Electrode structure 20 is therefore expected to have long-term durability and reliability.

In electrode structure 20 according to the present embodiment, foam 15 forms an outline of steering wheel 1.

With this, electrode structure 20 can be covered with foam 15, so that electrode structure 20 can be protected by foam 15 and the driver can easily grip steering wheel 1.

Electrode structure 20 according to the present embodiment further includes: insulating support 22 arranged to face core metal 11 of steering wheel 1. First resin layer 21 is arranged on a surface of insulating support 22 opposite to a surface of insulating support 22 facing core metal 11. Insulating support 22 includes an engagement portion that engages an engagement-target portion provided on core metal 11.

With this, electrode structure 20 can be attached to core metal 11 by engaging the engagement portion of insulating support 22 with the engagement-target portion provided on core metal 11. In this way, electrode structure 20 can be arranged inside steering wheel 1.

Since the engagement between the engagement-target portion and the engagement portion can fasten electrode structure 20 to core metal 11, it is possible to prevent electrode structure 20 from being displaced with respect to core metal 11 or being rotationally displaced with respect to the circumferential direction of steering wheel 1 due to pressure at the time of forming foam 15 of steering wheel 1.

In electrode structure 20 according to the present embodiment, the one surface of first resin layer 21 on which first electrode 31 is arranged faces core metal 11.

With this, even if sweat from a person's hand gripping steering wheel 1 seeps into steering wheel 1, the sweat is unlikely to reach first electrode 31. First electrode 31 can therefore be prevented from corrosion or peeling from first resin layer 21.

Variation 1 of Embodiment

First, electrode structure 20a according to Variation 1 of the embodiment will be described with reference to FIG. 8A to FIG. 10.

Figure 8A:
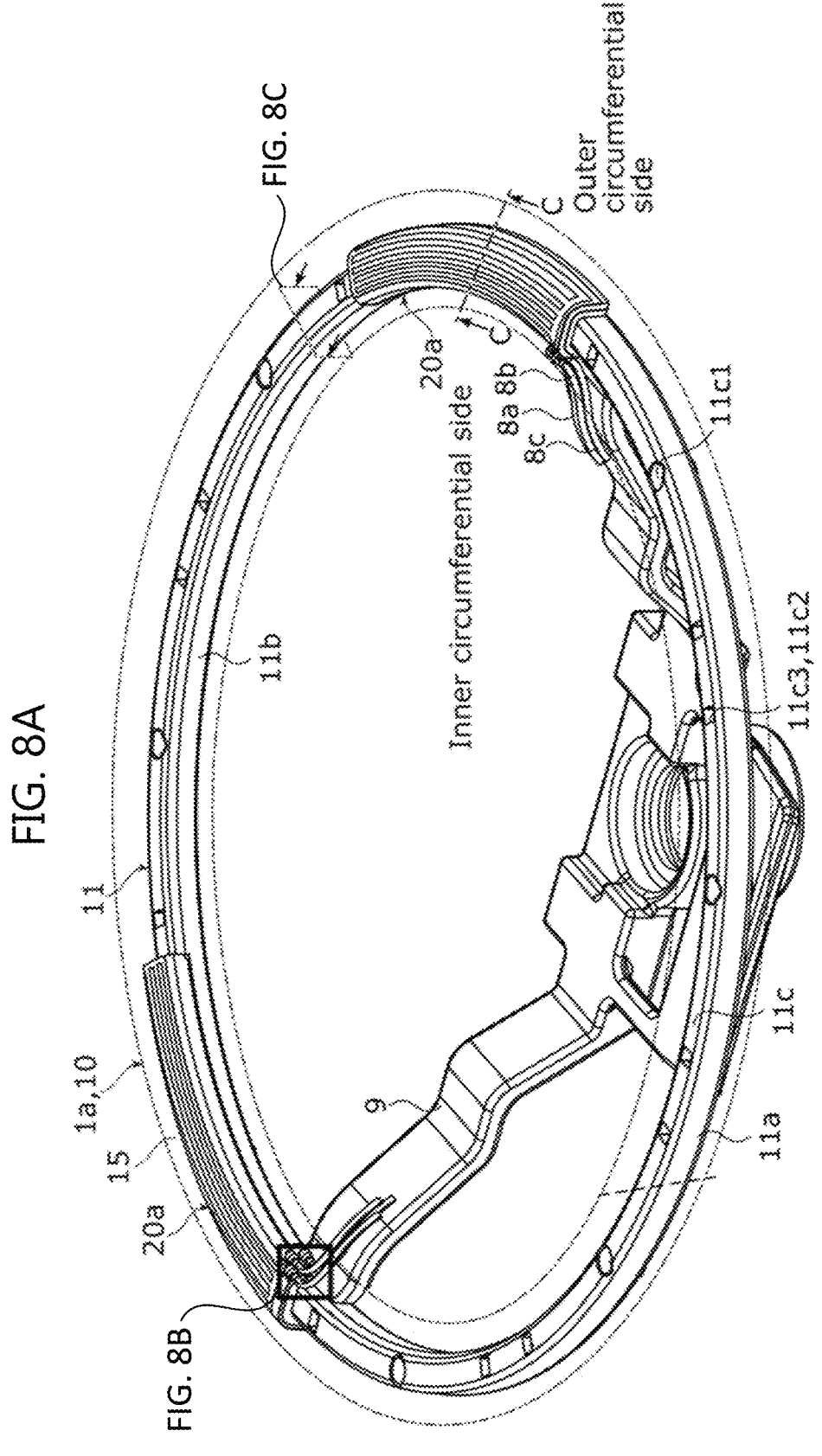
FIG. 8A is a perspective view of a steering wheel according to Variation 1 of the embodiment.
Figure 8B:
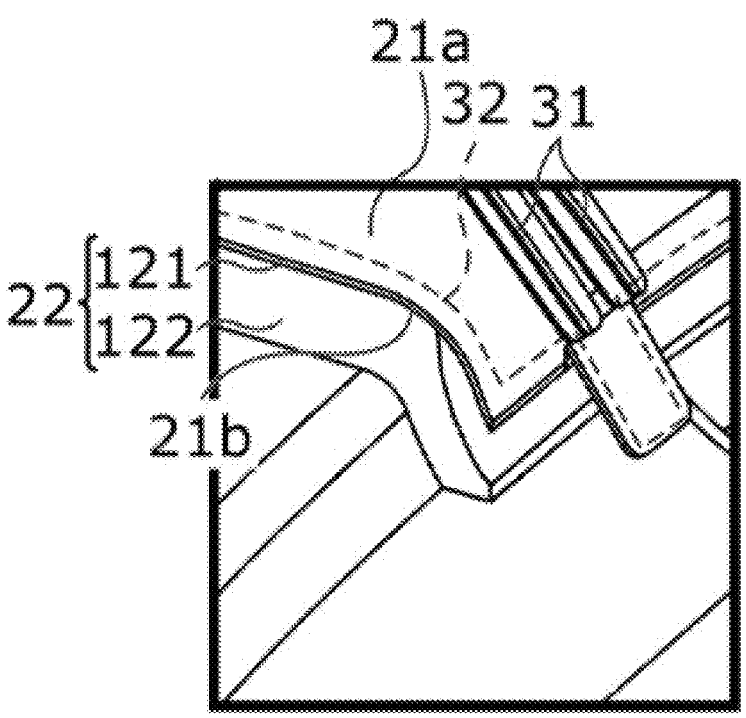
FIG. 8B is an enlarged view of part of an electrode structure of the steering wheel in FIG. 8A.
Figure 8C:
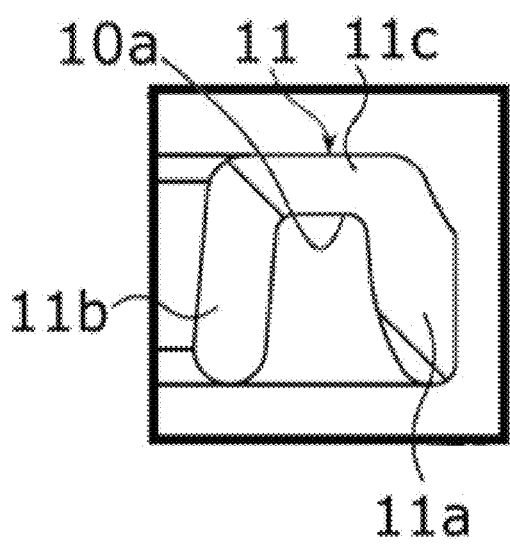
FIG. 8C is a cross sectional view of a core metal of the steering wheel in FIG. 8A.
Figure 9:
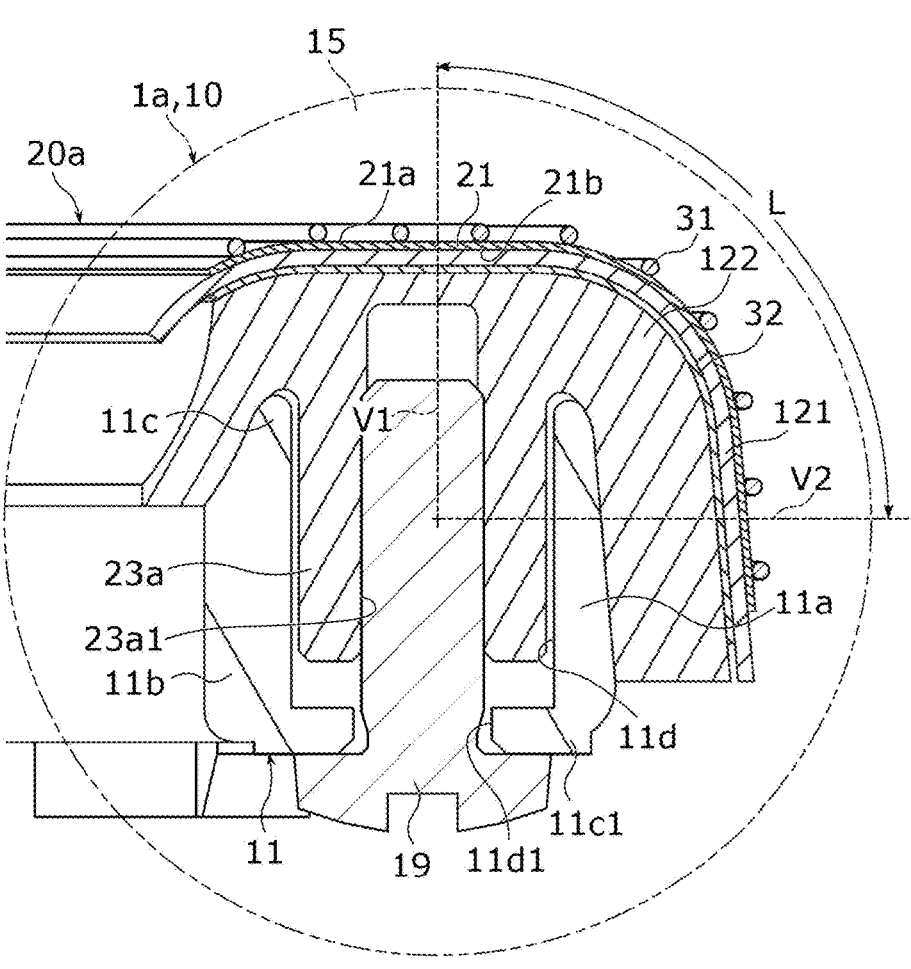
FIG. 9 is a cross sectional view of the steering wheel taken along line C-C in FIG. 8A, illustrating a first engagement-target portion and a first engagement portion.
Figure 10:
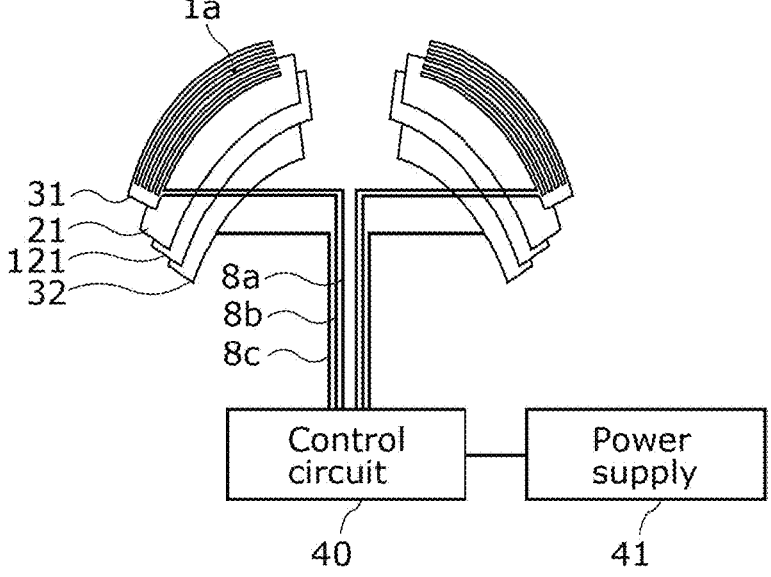
FIG. 10 is a block diagram illustrating the steering wheel according to Variation 1 of the embodiment.

FIG. 8A is a perspective view of steering wheel 1a according to Variation 1 of the embodiment. FIG. 8B is an enlarged view of part of an electrode structure of the steering wheel 1a in FIG. 8A. FIG. 8C is a cross sectional view of core metal 11 of the steering wheel 1a in FIG. 8A. In the partially enlarged view illustrating first electrode 31, second electrode 32, and insulating support 22 in FIGS. 8B harnesses 8a, 8b, and 8c are omitted. FIG. 9 is a cross sectional view of steering wheel 1a taken along line C-C in FIG. 8A illustrating first engagement-target portion 11c1 and first engagement portion 23a. FIG. 10 is a block diagram illustrating steering wheel 1a according to Variation 1 of the embodiment.

The present variation is different from the embodiment in that electrode structure 20a includes second electrode 32 and the like. Other elements in the present variation are the same as those in the embodiment unless otherwise stated. Elements that are essentially the same as those in the embodiment are given the same reference signs and their detailed description is omitted.

In the present variation, electrode structure 20a includes second electrode 32 in addition to first resin layer 21, insulating support 22, and first electrode 31, as illustrated in FIG. 8A to FIG. 10. Insulating support 22 includes first insulating support 121 and second insulating support 122 that is arranged to face core metal 11 of steering wheel 1a.

First electrode 31 is arranged on first surface 21a of first resin layer 21 that is opposite to the surface of first resin layer 21 facing core metal 11, and first insulating support 121 is arranged on second surface 21b of first resin layer 21 facing core metal 11. Second electrode 32 is arranged on the surface of first insulating support 121 opposite to its surface facing first resin layer 21. More specifically, first insulating support 121 and first resin layer 21 are arranged between first electrode 31 and second electrode 32. Thus, first resin layer 21 and first insulating support 121 can keep first electrode 31 and second electrode 32 from being electrically connected to each other. First resin layer 21 and first insulating support 121 as described above make it possible for first electrode 31 and second electrode 32 to be separate from each other in a state of overlapping each other.

Second insulating support 122 is arranged on the surface of second electrode 32 facing core metal 11. In other words, second insulating support 122 is arranged to face core metal 11 of steering wheel 1a. More specifically, second insulating support 122 is coupled to core metal 11, and is arranged along the outer circumferential side surface of core metal 11. Part of core metal 11 is thus covered with second insulating support 122, etc.

In the present variation, second insulating support 122 extends in the circumferential direction of core metal 11 so as to fill in the space between second electrode 32 and core metal 11 and to have the same length as first electrode 31, first resin layer 21, first insulating support 121, and second electrode 32, but this is non-limiting. Second insulating support 122 may be arranged partially between second electrode 32 and core metal 11.

Such second electrode 32 is composed of a metal plate. In this case, second electrode 32 is attached to first insulating support 121 and/or second insulating support 122 with adhesive, double-sided tape, or the like. Second electrode 32 is, for example, a metal containing copper, aluminum, or the like.

First electrode 31, first resin layer 21, first insulating support 121, second electrode 32, and second insulating support 122 are each arranged in the circumferential direction of core metal 11. Moreover, second electrode 32 is arranged along the shape of second insulating support 122. Thus, the respective shapes of first electrode 31 and first resin layer 21 correspond to the shape of first insulating support 121, and the shape of second electrode 32 corresponds to the respective shapes of first insulating support 121 and second insulating support 122.

First electrode 31, first resin layer 21, first insulating support 121, second electrode 32, and second insulating support 122 may be integrally formed, and, alternatively, may be formed as individual separable elements.

First electrode 31 is electrically connected to harnesses 8a and 8b, and second electrode 32 is electrically connected to harness 8c.

As illustrated in FIG. 8A, FIG. 8B, FIG. 8C, and FIG. 10, harness 8c is electrically connected to second electrode 32 of electrode structure 20a, and also electrically connected to control circuit 40. Harness 8c and second electrode 32 may be electrically connected by soldering harness 8c and second electrode 32 together. Alternatively, harness 8c and second electrode 32 may be electrically connected by riveting or eyeleting harness 8c and second electrode 32 together.

First electrode 31 as described above serves both as an electrostatic sensor electrode that detects a grip on steering wheel 1a and as a heater wire that warms steering wheel 1a.

More specifically, first electrode 31 is used either as an electrostatic sensor electrode or as a heater wire exclusively. In detail, control circuit 40 selectively switches between using first electrode 31 as an electrostatic sensor electrode and using first electrode 31 as a heater wire.

First electrode 31 may be a heater wire and function as a heater that warms steering wheel 1a. In other words, first electrode 31 may not be used as an electrostatic sensor electrode. Alternatively, first electrode 31 may be used only as an electrostatic sensor electrode and not as a heater wire. The electrostatic sensor electrode in this case is a grip sensor that detects a grip on steering wheel 1a.

When first electrode 31 is used as an electrostatic sensor electrode, an AC voltage is applied to first electrode 31. The AC voltage applied to first electrode 31 is generated by control circuit 40 using power supplied from power supply 41. Since first electrode 31 is arranged on first surface 21a of first insulating support 121, when the part of rim 10 in which first electrode 31 is arranged is gripped by the driver's hand, a capacitance is formed between first electrode 31 and the driver's hand. Control circuit 40 can thus detect the driver's hand gripping rim 10 based on the change in capacitance.

When first electrode 31 is used as a heater wire, a DC voltage is applied to first electrode 31. The DC voltage applied to first electrode 31 is generated by power supply 41. First electrode 31 generates heat using power from power supply 41 controlled by control circuit 40.

An example in which first electrode 31 is used either as an electrostatic sensor electrode or as a heater wire exclusively will be described below.

For example, after an AC voltage is applied to first electrode 31 and first electrode 31 is used as an electrostatic sensor electrode, the application of the AC voltage to first electrode 31 is stopped. After a predetermined period of time since the application of the AC voltage to first electrode 31 is stopped, a DC voltage is applied to first electrode 31 and first electrode 31 is used as a heater wire. Further, the application of the DC voltage to first electrode 31 is stopped, and, after a predetermined period of time, an AC voltage is applied to first electrode 31 and first electrode 31 is used as an electrostatic sensor electrode. Such operation is repeatedly performed to use first electrode 31 either as an electrostatic sensor electrode or as a heater wire exclusively.

An AC voltage is applied to second electrode 32. Power supplied to first electrode 31 and second electrode 32 is generated by control circuit 40 using power supplied from power supply 41.

AC voltages of the same phase may be applied to first electrode 31 and second electrode 32. By applying AC voltages of the same phase to first electrode 31 and second electrode 32, it is possible to cancel out or reduce the capacitance formed between first electrode 31 and core metal 11. This allows control circuit 40 to accurately detect the capacitance formed between first electrode 31 and the driver's hand.

As illustrated in FIG. 9, when first electrode 31 and second electrode 32 overlap, the surface area of second surface 21b covered with second electrode 32 is greater than the surface area of first surface 21a covered with first electrode 31. Hence, second electrode 32 can inhibit the formation of capacitance between first electrode 31 and core metal 11.

In the present variation, first electrode 31, first resin layer 21, first insulating support 121, second electrode 32, and second insulating support 122 are each arranged in the circumferential direction of the cross section of rim 10 over a range of at least ¼th of the circumference. First electrode 31, first resin layer 21, first insulating support 121, second electrode 32, and second insulating support 122 are each arranged over a range greater than range L between two straight lines V1 and V2 denoted by chain double-dashed lines. More specifically, first electrode 31, first resin layer 21, first insulating support 121, second electrode 32, and second insulating support 122 are arranged spanning from first portion 11a to second portion 11b through coupling portion 11c of rim 10. In this way, first electrode 31, first resin layer 21, first insulating support 121, second electrode 32, and second insulating support 122 are arranged in each part easily contacted by the driver's hand when the driver's hand grips rim 10, whereby the driver's grip on steering wheel 1a can be accurately detected by electrode structure 20a.

First electrode 31, first resin layer 21, first insulating support 121, second electrode 32, second insulating support 122, and core metal 11 are embedded in foam 15.

Next, the advantageous effects of electrode structure 20a according to the present variation will be described.

As described above, electrode structure 20a according to the present variation further includes: second electrode 32 arranged on the surface of first resin layer 21 facing core metal 11. Insulating support 22 includes first insulating support 121 and second insulating support 122 that is arranged to face core metal 11 of steering wheel 1a. Second insulating support 122 is arranged on a surface of second electrode 32 facing core metal 11. First electrode 31 is a heater wire.

With this, first electrode 31 and second electrode 32 can be separated from each other, and also first electrode 31 and second electrode 32 can be separated from core metal 11. Moreover, as a result of first electrode 31 and second electrode 32 being integrally assembled to insulating support 22, electrode structure 20a can be easily assembled to core metal 11.

Variation 2 of Embodiment

First, electrode structure 20b according to Variation 2 of the embodiment will be described with reference to FIG. 11A to FIG. 13.

Figure 11B:
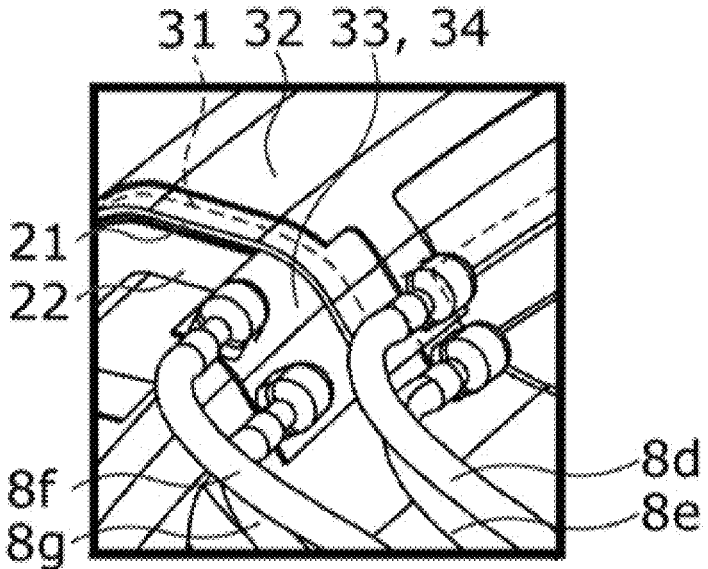
FIG. 11B is an enlarged view of part of an electrode structure of the steering wheel in FIG. 11A.
Figure 11C:
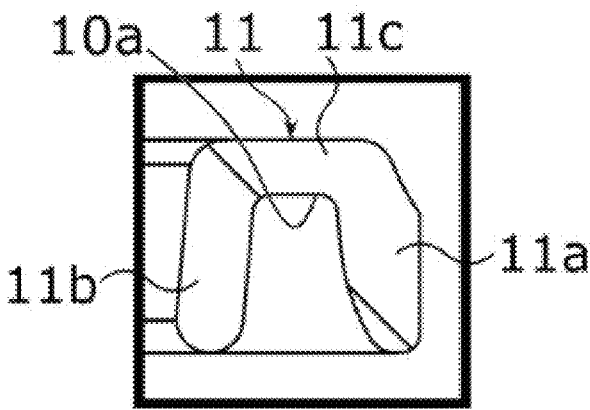
FIG. 11C is a cross sectional view of a core metal of the steering wheel in FIG. 11A.
Figure 12:
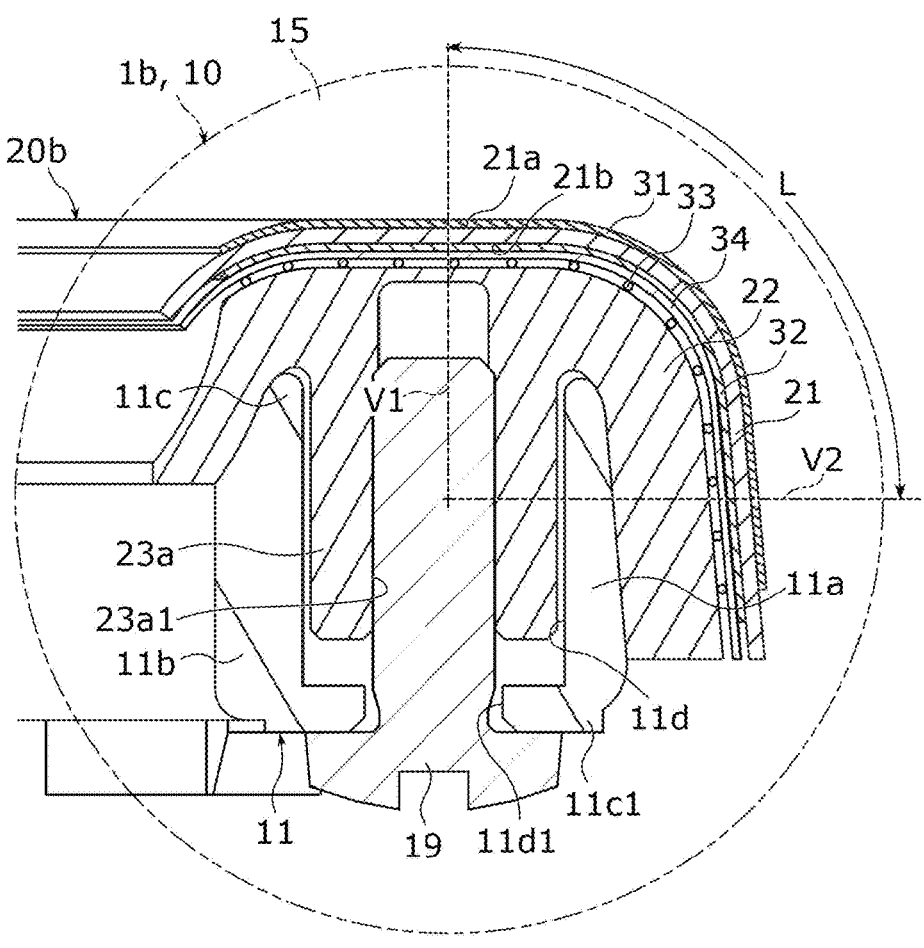
FIG. 12 is a cross sectional view of the steering wheel taken along line D-D in FIG. 11A, illustrating a first engagement-target portion and a first engagement portion.
Figure 13:
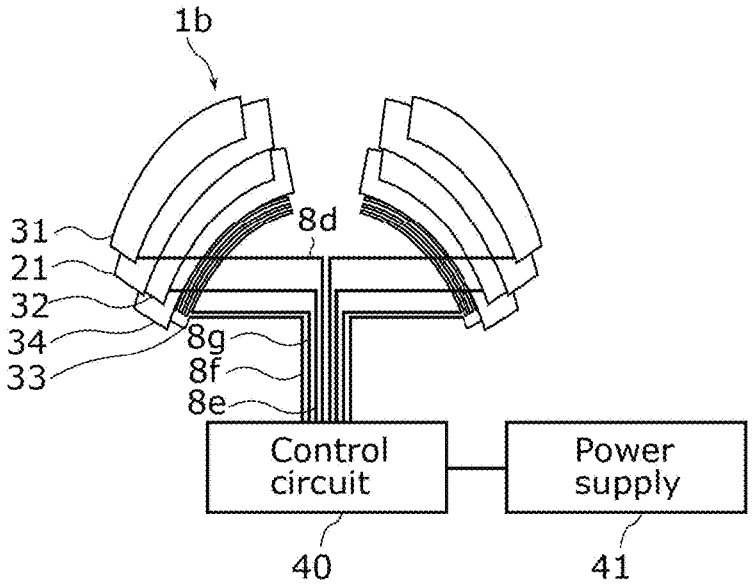
FIG. 13 is a block diagram illustrating the steering wheel according to Variation 2 of the embodiment.

FIG. 11A is a perspective view of steering wheel 1b according to Variation 2 of the embodiment. FIG. 11B is an enlarged view of part of an electrode structure of the steering wheel 1b in FIG. 11A. FIG. 11C is a cross sectional view of core metal 11 of the steering wheel 1b in FIG. 11A. FIG. 12 is a cross sectional view of steering wheel 1b taken along line D-D in FIG. 11A, illustrating first engagement-target portion 11c1 and first engagement portion 23a. FIG. 13 is a block diagram illustrating steering wheel 1b according to Variation 2 of the embodiment.

The present variation is different from the embodiment in that electrode structure 20b includes second electrode 32, second resin layer 34, and heater wire 33. Other elements in the present variation are the same as those in the embodiment unless otherwise stated. Elements that are essentially the same as those in the embodiment are given the same reference signs and their detailed description is omitted.

Electrode structure 20b includes second electrode 32, second resin layer 34, and heater wire 33 in addition to first resin layer 21, insulating support 22, and first electrode 31.

First electrode 31 is arranged on first surface 21a of first resin layer 21. First electrode 31 is separated from second electrode 32 by first resin layer 21, and therefore is not electrically connected to second electrode 32.

First electrode 31 is composed of a metal plate. In this case, first electrode 31 is attached to first resin layer 21 with adhesive, double-sided tape, or the like.

Second electrode 32 is arranged on second surface 21b of first resin layer 21 opposite to first surface 21a of first resin layer 21. More specifically, second electrode 32 is arranged along second surface 21b of first resin layer 21 so as to sandwich first resin layer 21 with first electrode 31. Second electrode 32 is sandwiched between first resin layer 21 and second resin layer 34. In other words, second electrode 32 is arranged on the surface of second resin layer 34.

Second electrode 32 is composed of a metal plate. In this case, second electrode 32 is attached to first resin layer 21 with adhesive, double-sided tape, or the like.

First electrode 31 is electrically connected to harness 8d, and second electrode 32 is electrically connected to harness 8e.

Harness 8d is electrically connected to first electrode 31 of electrode structure 20b, and also electrically connected to control circuit 40. Harness 8d and first electrode 31 may be electrically connected by riveting or eyeleting harness 8d and first electrode 31 together. Alternatively, harness 8d and first electrode 31 may be electrically connected by soldering harness 8d and first electrode 31 together.

Second resin layer 34 is a base material for arranging heater wire 33 on one surface thereof. Second resin layer 34 is arranged between heater wire 33 and second electrode 32 so that one surface of second resin layer 34 will support heater wire 33 and the other surface of second resin layer 34 opposite to the one surface will face second electrode 32.

Second resin layer 34 is arranged on the side of second electrode 32 closer to (i.e. facing) core metal 11. Second resin layer 34 is sheet-shaped or film-shaped. The shape of second resin layer 34 corresponds to the shape of insulating support 22. In other words, second resin layer 34 is formed according to the size and shape of insulating support 22. Second resin layer 34 may be formed by vacuum forming or the like.

Second resin layer 34 is made of, for example, a resin material such as modified polyphenylene ether or modified polyphenylene oxide.

Second resin layer 34 may be insulating double-sided tape. In this case, for example, heater wire 33 may be a thin metal plate formed into a desired shape by etching or the like and attached to one surface of second resin layer 34.

Heater wire 33 is arranged on the surface of second resin layer 34 facing core metal 11. Heater wire 33 is arranged between insulating support 22 and second resin layer 34 so as to face insulating support 22. In other words, insulating support 22 is arranged on the surface of heater wire 33 facing core metal 11.

Heater wire 33 is a conductive wire containing copper, aluminum, silver, or the like. Heater wire 33 may include a metal thin film formed on second resin layer 34 by, for instance, application of conductive ink or etching.

One end of heater wire 33 is electrically connected to harness 8f, and the other end of first electrode 31 is electrically connected to harness 8g.

Harness 8f is electrically connected to one end of heater wire 33, and also electrically connected to control circuit 40. Harness 8f and one end of heater wire 33 may be electrically connected by soldering harness 8f and one end of heater wire 33 together. Alternatively, harness 8f and one end of heater wire 33 may be electrically connected by riveting or eyeleting harness 8f and one end of heater wire 33 together.

Harness 8g is electrically connected to one end of heater wire 33, and also electrically connected to control circuit 40. Harness 8g and one end of heater wire 33 may be electrically connected by soldering harness 8g and one end of heater wire 33 together. Alternatively, harness 8g and one end of heater wire 33 may be electrically connected by riveting or eyeleting harness 8g and one end of heater wire 33 together.

Control circuit 40 is electrically connected to harnesses 8d, 8e, 8f, and 8g. To use first electrode 31 as an electrostatic sensor electrode, an AC voltage from control circuit 40 is applied to first electrode 31 and second electrode 32 via harnesses 8d and 8e. The AC voltage applied to first electrode 31 and second electrode 32 is generated by control circuit 40 using power supplied from power supply 41. A DC voltage from control circuit 40 is applied to heater wire 33 via harnesses 8f and 8g. The DC voltage applied to heater wire 33 is generated by power supply 41.

AC voltages of the same phase may be applied to first electrode 31 and second electrode 32. By applying AC voltages of the same phase to first electrode 31 and second electrode 32, it is possible to cancel out or reduce the capacitance formed between first electrode 31 and core metal 11. This allows control circuit 40 to accurately detect the capacitance formed between first electrode 31 and the driver's hand.

Next, the advantageous effects of electrode structure 20b according to the present variation will be described.

As described above, electrode structure 20b according to the present variation further includes: second electrode 32 arranged on the surface of first resin layer 21 facing core metal 11; second resin layer 34 arranged on a surface of second electrode 32 facing core metal 11; and heater wire 33 arranged on a surface of second resin layer 34 facing core metal 11. Insulating support 22 is arranged on a surface of heater wire 33 facing core metal 11.

With this, first electrode 31 and second electrode 32 can be separated from each other, and also first electrode 31 and second electrode 32 can be separated from core metal 11. Moreover, as a result of first electrode 31 and second electrode 32 being integrally assembled to insulating support 22, electrode structure 20b can be easily assembled to core metal 11.

Furthermore, since first resin layer 21 is arranged between first electrode 31 and second electrode 32 and second resin layer 34 is arranged between heater wire 33 and second electrode 32, heater wire 33 and second electrode 32 can be kept from being electrically connected to each other. It is therefore possible to simultaneously fulfill the heater function of heater wire 33 and the function of detecting the driver's hand gripping steering wheel 1b.

In addition, second resin layer 34, second electrode 32, first resin layer 21, and first electrode 31 are arranged on the side of heater wire 33 opposite to the insulating support 22 side.

Accordingly, when first electrode 31 and second electrode 32 are heated by heater wire 33, the thermal diffusion effect of first electrode 31 and second electrode 32 can inhibit temperature variations on the surface of steering wheel 1b.

As a result of not only first resin layer 21 but also second resin layer 34 being sheet-shaped or film-shaped, the thicknesses of first resin layer 21 and second resin layer 34 arranged on the side of heater wire 33 opposite to the insulating support 22 side can be reduced. Therefore, the heat of heater wire 33 can be easily conducted to the surface of steering wheel 1b.

Other Variations

While the electrode structure according to the present disclosure has been described above by way of the embodiments, the present disclosure is not limited to these embodiments. Other modifications obtained by applying various changes conceivable by a person skilled in the art to each embodiment without departing from the scope of the present disclosure are also included in the present disclosure. The embodiments include Variations 1 and 2 of the embodiment.

Figure 14:
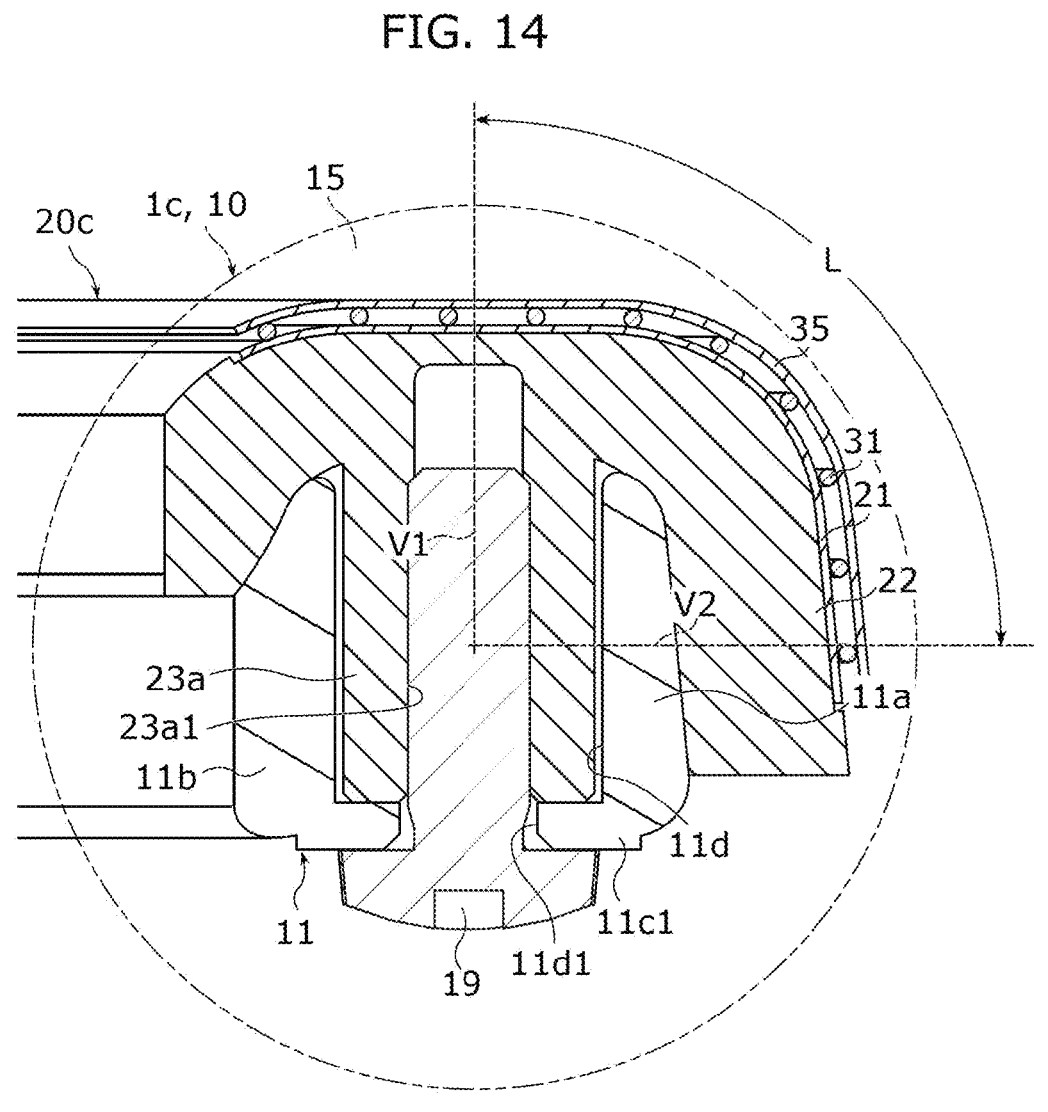

Refer to FIG. 14 for such an electrode structure according to another variation of the above-described embodiments. FIG. 14 is a cross sectional view of steering wheel 1c according to another variation, illustrating first engagement-target portion 11c1 and first engagement portion 23a. Electrode structure 20c may further include third resin layer 35 that is arranged on the surface of first electrode 31 opposite to its surface facing first resin layer 21 and is essentially made of a sheet or film of modified polyphenylene ether or modified polyphenylene oxide. In other words, first electrode 31 is sandwiched between third resin layer 35 and first resin layer 21. With this, even if sweat from a person's hand gripping steering wheel 1c seeps into steering wheel 1c, the sweat is unlikely to reach first electrode 31. First electrode 31 can therefore be prevented from corrosion or peeling from first resin layer 21 and third resin layer 35. Third resin layer 35 may be applied to Variations 1 and 2 of the embodiment.

In the above-described embodiments, the core metal includes the first engagement-target portion and the second engagement-target portion, but the core metal is not limited to such. For example, the core metal may include the second engagement-target portion and not the first engagement-target portion. In this case, the electrode structure may include the second engagement portion and not the first engagement portion. Alternatively, the core metal may include the first engagement-target portion and not the second engagement-target portion. In this case, the electrode structure may include the first engagement portion and not the second engagement portion.

In the above-described embodiments, a plurality of electrode structures may be connected to each other in the circumferential direction of the core metal. For example, an electrode structure may be connected to another electrode structure. In this case, harnesses may be electrically connected to a plurality of first electrodes and a plurality of second electrodes individually.

In the above-described embodiments, the core metal may be inverted so as to be plane-symmetric with respect to the plane of the opening on the inner circumferential side of the core metal, and the position at which the electrode structure is attached to the core metal may be inverted. In other words, the core metal may be fixed to the spoke so that the recessed portion of the core metal opens to the driver's seat side. The electrode structure may be attached to the side of the core metal facing the front of the vehicle so as to cover a protruding portion opposite to the recessed portion of the core metal.

Other modifications obtained by applying various changes conceivable by a person skilled in the art to each embodiment and any combinations of the elements and functions in each embodiment without departing from the scope of the present disclosure are also included in the present disclosure.

(Supplementary Notes)

The following lists the features of the electrode structure described based on the above-described embodiments.

<Technical Aspect 1>

An electrode structure that is arranged over a core metal of a steering wheel, the electrode structure comprising:

a first resin layer; and a first electrode arranged on one surface of the first resin layer, wherein the first resin layer is essentially made of a sheet or film of modified polyphenylene ether or modified polyphenylene oxide.

<Technical Aspect 2>

The electrode structure according to Technical Aspect 1, wherein the first resin layer is arranged close to the core metal in the steering wheel, and the one surface of the first resin layer on which the first electrode is arranged is opposite to a surface of the first resin layer facing the core metal.

<Technical Aspect 3>

The electrode structure according to Technical Aspect 1 or 2, wherein the first electrode is formed of a conductive wire, a metal thin film, or a conductive ink.

<Technical Aspect 4>

The electrode structure according to any one of Technical Aspects 1 to 3, wherein the first electrode is a heater wire.

<Technical Aspect 5>

The electrode structure according to Technical Aspect 4, wherein the first electrode functions as a heater that warms the steering wheel.

<Technical Aspect 6>

The electrode structure according to any one of Technical Aspects 1 to 5, wherein the first electrode is an electrostatic sensor electrode.

<Technical Aspect 7>

The electrode structure according to Technical Aspect 6, wherein the electrostatic sensor electrode is a grip sensor that detects a grip on the steering wheel.

<Technical Aspect 8>

The electrode structure according to any one of Technical Aspects 1 to 7, further comprising:

a foam containing foamed polyurethane that covers at least the first resin layer.

<Technical Aspect 9>

The electrode structure according to Technical Aspect 8, wherein the foam forms an outline of the steering wheel.

<Technical Aspect 10>

The electrode structure according to any one of Technical Aspects 1 to 9, further comprising:

a third resin layer arranged on a surface of the first electrode opposite to a surface of the first electrode facing the first resin layer, the third resin layer being essentially made of a sheet or film of modified polyphenylene ether or modified polyphenylene oxide.

<Technical Aspect 11>

The electrode structure according to any one of Technical Aspects 1 to 10, further comprising:

an insulating support arranged to face the core metal of the steering wheel, wherein the first resin layer is arranged on a surface of the insulating support opposite to a surface of the insulating support facing the core metal, and the insulating support includes an engagement portion that engages an engagement-target portion provided on the core metal.

<Technical Aspect 12>

The electrode structure according to Technical Aspect 11, further comprising:

a second electrode arranged on the surface of the first resin layer facing the core metal, wherein the insulating support includes a first insulating support and a second insulating support that is arranged to face the core metal of the steering wheel, the second insulating support is arranged on a surface of the second electrode facing the core metal, and the first electrode is a heater wire.

<Technical Aspect 13>

The electrode structure according to Technical Aspect 11, further comprising:

a second electrode arranged on the surface of the first resin layer facing the core metal;

a second resin layer arranged on a surface of the second electrode facing the core metal; and a heater wire arranged on a surface of the second resin layer facing the core metal, wherein the insulating support is arranged on a surface of the heater wire facing the core metal.

<Technical Aspect 14>

The electrode structure according to Technical Aspect 1, wherein the one surface of the first resin layer on which the first electrode is arranged faces the core metal.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2023-079370 filed on May 12, 2023.

INDUSTRIAL APPLICABILITY

The electrode structure according to the present disclosure is applicable to, for example, a steering wheel or the like of a vehicle.

The invention claimed is:

1. An electrode structure that is arranged over a core metal of a steering wheel, the electrode structure comprising:

a first resin layer;

a first electrode arranged on a first surface of the first resin layer; and an insulating support arranged to face the core metal of the steering wheel, wherein the first resin layer is made of a sheet or film of modified polyphenylene ether or modified polyphenylene oxide, the first resin layer is arranged closer to the core metal in the steering wheel than the first electrode, the first surface of the first resin layer on which the first electrode is arranged is opposite to a second surface of the first resin layer facing the core metal, the first resin layer is arranged on a surface of the insulating support opposite to a surface of the insulating support facing the core metal, and the insulating support includes an engagement portion that engages an engagement-target portion provided on the core metal.

2. The electrode structure according to claim 1, wherein the first electrode is formed of a conductive wire, a metal film, or a conductive ink.

3. The electrode structure according to claim 1, wherein the first electrode is a heater wire.

4. The electrode structure according to claim 3, wherein the first electrode functions as a heater that warms the steering wheel.

5. The electrode structure according to claim 1, wherein the first electrode is an electrostatic sensor electrode.

6. The electrode structure according to claim 5, wherein the electrostatic sensor electrode is a grip sensor that detects a grip on the steering wheel.

7. The electrode structure according to claim 1, further comprising:

a foam containing foamed polyurethane that covers at least the first resin layer.

8. The electrode structure according to claim 7, wherein the foam forms an outline of the steering wheel.

9. The electrode structure according to claim 1, further comprising:

an outer resin layer arranged on a surface of the first electrode opposite to a surface of the first electrode facing the first resin layer, the outer resin layer being made of a sheet or film of modified polyphenylene ether or modified polyphenylene oxide.

10. The electrode structure according to claim 1, further comprising:

a second electrode, wherein the insulating support includes a first insulating support and a second insulating support that is arranged to face the core metal of the steering wheel, the second electrode arranged on the surface of the first insulating support facing the core metal, the second insulating support is arranged on a surface of the second electrode facing the core metal, and the first electrode is a heater wire.

11. The electrode structure according to claim 1, further comprising:

a second electrode arranged on the second surface of the first resin layer facing the core metal;

a second resin layer arranged on a surface of the second electrode facing the core metal; and a heater wire arranged on a surface of the second resin layer facing the core metal, wherein the insulating support is arranged on a surface of the heater wire facing the core metal.

12. An electrode structure that is arranged over a core metal of a steering wheel, the electrode structure comprising:

a first resin layer;

a first electrode arranged on a first surface of the first resin layer, wherein the first resin layer is made of a sheet or film of modified polyphenylene ether or modified polyphenylene oxide, the first resin layer is arranged closer to the core metal in the steering wheel than the first electrode, the first surface of the first resin layer on which the first electrode is arranged is opposite to a second surface of the first resin layer facing the core metal; and an outer resin layer arranged on a surface of the first electrode opposite to a surface of the first electrode facing the first resin layer, the outer resin layer being made of a sheet or film of modified polyphenylene ether or modified polyphenylene oxide.

* * * * *